United States Patent [19]
Schwaller

[11] Patent Number: 5,585,850
[45] Date of Patent: Dec. 17, 1996

[54] ADAPTIVE DISTRIBUTION SYSTEM FOR TRANSMITTING WIDEBAND VIDEO DATA OVER NARROWBAND MULTICHANNEL WIRELESS COMMUNICATION SYSTEM

[76] Inventor: John Schwaller, 1358 Buffing Cir., Palm Bay, Fla. 32909

[21] Appl. No.: 331,773

[22] Filed: Oct. 31, 1994

[51] Int. Cl.$^6$ ................................... H04N 7/12
[52] U.S. Cl. .................... 348/388; 348/387; 455/33.1
[58] Field of Search ................... 348/13–17, 385, 348/397, 398, 409, 388; 370/112, 84, 62; 375/260; 379/58, 59, 61; 455/33.1, 72, 3.2

[56] References Cited

U.S. PATENT DOCUMENTS

| | | | |
|---|---|---|---|
| 4,608,711 | 8/1986 | Goldman | 379/58 |
| 4,747,160 | 5/1988 | Bossard | 455/33.1 |
| 4,918,524 | 4/1990 | Ansari | 348/398 |
| 5,268,897 | 12/1993 | Komine et al. | 375/260 |
| 5,276,525 | 1/1994 | Gharavi | 348/409 |
| 5,282,222 | 1/1994 | Fattouche et al. | 375/200 |
| 5,325,419 | 6/1994 | Connolly et al. | 455/33.1 |
| 5,349,631 | 9/1994 | Lee | 379/59 |
| 5,381,459 | 1/1995 | Lappington | 375/260 |
| 5,410,737 | 4/1995 | Jones | 455/33.1 |
| 5,412,429 | 5/1995 | Glover | 348/397 |
| 5,426,460 | 6/1995 | Erving et al. | 348/14 |
| 5,428,668 | 6/1995 | Dent et al. | 455/33.1 |

FOREIGN PATENT DOCUMENTS

| | | | |
|---|---|---|---|
| 0000185 | 1/1987 | Japan | 348/385 |
| 4183085 | of 1991 | Japan | H04N 7/14 |
| 3-1690 | of 1991 | Japan | H04N 7/14 |
| 3105383 | of 1992 | Japan | H04N 7/00 |
| 2256771 | 12/1992 | United Kingdom | H04N 7/18 |
| 9117622 | 11/1991 | WIPO | H04M 11/08 |
| 9424773 | 10/1994 | WIPO | 348/15 |

OTHER PUBLICATIONS

MMDS (Wireless Cable): An Alternative Delivery Medium for Digital Terrestrial TV.; J. Caffrey; International Broadcast Convention. 16–20 Sep. 94 Conference Publication No. 397 IEEE 1994 pp. 611–619.
Mobile Broadband System; P. Huish, J. T. Zubrzycki, M Lurdes Lourenco; pp. 7/1–7/4.
MBS–A Wireless Network for Digital Video; Zubrzycki, J. T. (R. D. Dept BBC) IBC 94. Conference Pub. #397 IEE 94 pp. 266–271.
A 22KBD Mobile Video Telephone Scheme; Stedman, R; Steele, R; IEEE, 1992 pp. 251–254 vol. 1 of 2 vol. 1092 p. 9.

*Primary Examiner*—Victor R. Kostak

[57] ABSTRACT

A technique for transmitting wideband signals such as video signals over a communication system such as a cellular or Personal Communication System (PCS) which only has narrowband channels. The video signal is first digitized and compressed, and then forwarded to a commutating switch, together with any other narrowband signals which are to be transmitted using the same system. The commutating switch demultiplexes the video signal into multiple digital channel signals. The number of digital channel signals dedicated to carrying the video signals may vary as a system controller determines the availability of channel space in the system. The output channels from the switch are then each modulated as required by the particular wireless communication system in use, and forwarded to a digital combiner to produce a wideband composite signal. At a receiving site, the process is reversed, and a digital filter bank, or channelizer, separates the digital channel signals and forwards them to a set of digital demodulators. The demodulated signals are then fed to a multiplexing switch, which, under command from a controller which receives instructions from a system channel assignment controller, directs the channel signals containing the video information to a first-in first-out buffer memory. The reconstructed digital video signal is then decompressed and converted back to analog form for display.

12 Claims, 3 Drawing Sheets

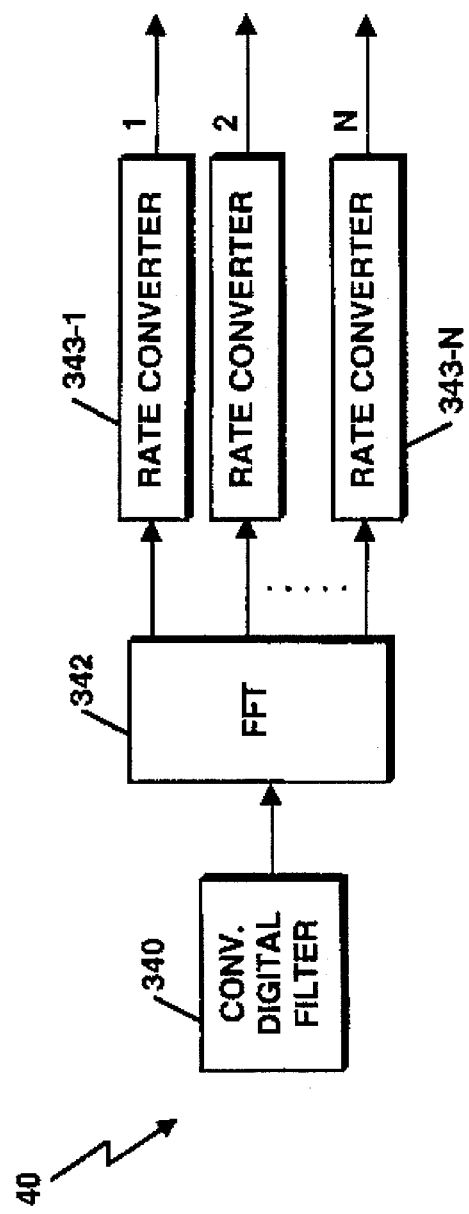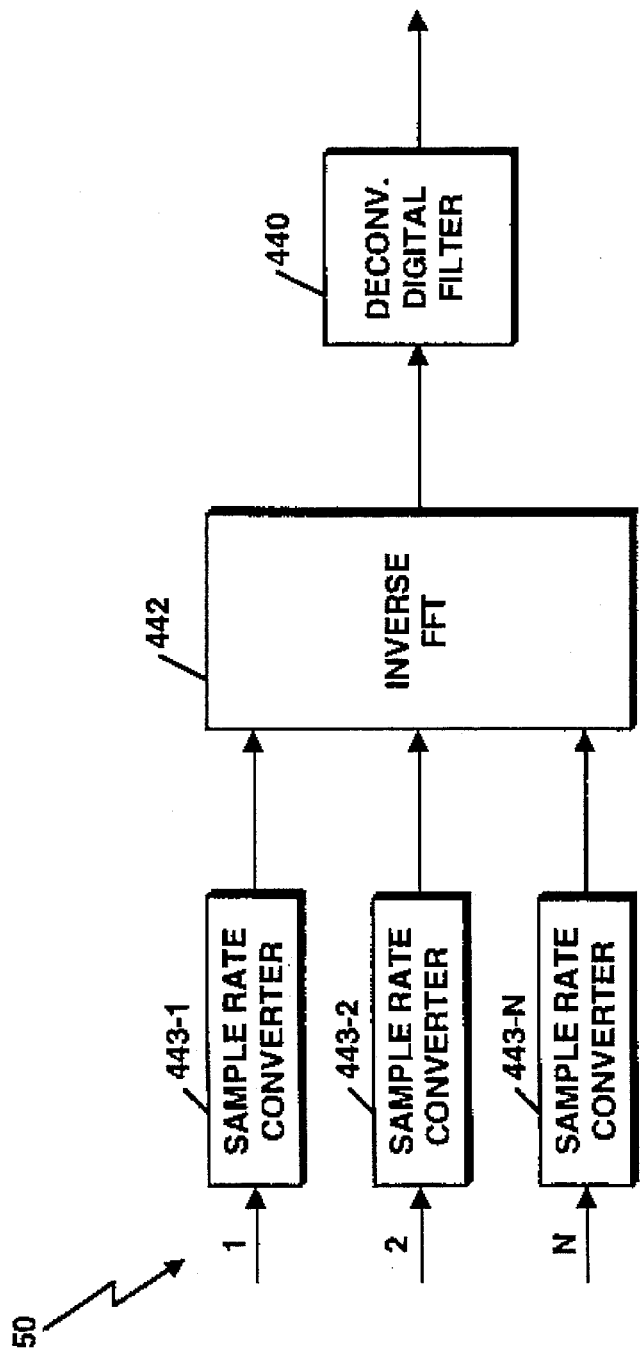

ADAPTIVE DISTRIBUTION SYSTEM FOR TRANSMITTING WIDEBAND VIDEO DATA OVER NARROWBAND MULTICHANNEL WIRELESS COMMUNICATION SYSTEM

FIELD OF THE INVENTION

This invention relates generally to communication systems, and in particular to a multichannel wireless communication system that allocates portions of the available radio spectrum to wideband signals such as video or data signals.

DESCRIPTION OF THE RELATED ART

Multiple-channel wireless communication services, such as cellular mobile telephone (CMT) and personal communication systems (PCS), are typically used to transmit voice signals over a set of relatively narrowband radio channels. Often times, however, not every channel in a such a multichannel wireless system is busy all of the time. It is therefore possible to transmit other types of signals over the unused channels, and indeed, this has been achieved in certain systems in the past.

With the increasing popularity of video devices such as broadcast and cable television as well as in multimedia computing devices, it is becoming increasingly important to distribute video information in any way possible. Certain types of systems which already have the required channel bandwidth, such as cable television systems, do lend themselves to fairly straightforward reuse of unused video channels.

However, existing and even proposed cellular and PCS systems are not easily adapted for the transmission of video signals over unused channel space. This is probably true for several reasons.

First, in a conventional cellular system, the channel bandwidth is chosen to support the transmission of audio signals, typically about 30 kilohertz (kHz). Since the bandwidth of even a compressed video signal is much greater than that, about 1.5 Megabits per second (Mbps), it is obvious that the use of multiple cellular channels must be coordinated in order to transmit even a single video signal. Significant demands would thus be placed on such a system, which must be capable of simultaneously receiving and transmitting signals over multiple channels. For example, each fixed base station in such a scenario would have to have a number of separate radio transceivers equal to the number of video signals to be transmitted times the video signal bandwidth divided by the typical voice channel bandwidth.

Furthermore, the activation of the multiple channels would have to be carefully coordinated by a central controller, so that transmission of the video signal in one cell would not interfere with transmission of signals in adjacent cells.

In particular, in a cellular system, each geographic area assigned to a service provider is typically divided into a set of regions called cells. In order to avoid interference with adjacent cells, and because of propagation restrictions with certain types of terrain, the number of channels available within any given cell is usually limited to a small subset of the entire channel set available to the service provider. In addition, this small subset of channels is fixed in frequency; that is, the particular frequencies assigned to each cell are fixed in advance by the service provider.

For example, in one arrangement, the channels are reused in a repeating pattern of seven cells, so that each fixed basestation site only has, at the most, one-seventh of the total system bandwidth. In addition, this small subset of channels is fixed in frequency, that is, the particular frequencies assigned to each cell are fixed in advance by the service providers. Thus, in a traditional cellular system architecture, each basestation has typically only a limited, number of transceivers tuned to a fixed set of frequencies available.

This problem is not alleviated, and indeed, only exacerbated in PCS systems, where the cell sizes could be much smaller than in cellular systems and the channel reuse planning is even more complex because of the increased density of cells.

As a practical matter, therefore, transmission of video information over unused channel capacity is an unrealistic option for traditional cellular and PCS arrangements.

In each of these prior art wireless systems, on-demand allocation of a sufficient number of channels to transmit a video signal has been thought to be impossible because of the fixed channel frequency allocation.

DESCRIPTION OF THE INVENTION

Objects of the Invention

Accordingly, it is an object of this invention to provide for the distribution of wideband signals as video over a wireless communication system which uses multiple narrowband channels.

Another object is to accomplish the distribution of wideband signals by making use of unused channels in the wireless communication system.

A further object is to provide a technique for splitting a wideband signal into multiple narrowband channel signals in such a manner that the multiple narrowband channel signals can be transmitted over a narrowband multichannel wireless system.

Yet another object is to provide a multichannel wireless communication system in which the number of channels dedicated to overlay signals is dynamically adjusted according to the demands of the system.

A still further object is to provide a set top box capable of receiving a video signal from a wireless multichannel communications system.

Other objects of this invention will, in part, be evident from reading the following summary and detailed description. The invention accordingly comprises an article of manufacture possessing the features and properties exemplified in the constructions described herein and the several steps and the relation of one or more of such steps with respect to the others and the apparatus embodying the features of construction, combination of elements and the arrangement of parts that are adapted to effect such steps, all as exemplified in the following summary and detailed description. The scope of the invention will be indicated in the claims.

BRIEF SUMMARY OF THE INVENTION

Briefly, the invention makes use of a wideband digital combiner and wideband digital channelizer to transmit video data over a narrowband channelized communication system. At the transmit site, the video signal is first digitized and compressed. The compressed video signal is then forwarded to a commutating switch, together with any other narrowband signals which are to be transmitted using the same system. The commutating switch demultiplexes the video signal into multiple digital channel signals. The number of digital channel signals dedicated to carrying the video signal at any point in time may vary, according to the number of available channels in the system. In addition, there may be a first-in first-out buffer prior to the commutating switch in order to normalize the rate of the samples of the video signal and to accommodate such fluctuations in the availability of the number of output channels.

The output channels from the switch are then each modulated as required by the particular wireless communication system in use. The modulated switch outputs are then forwarded to a wideband digital synthesizer, or so-called combiner, which accepts the demultiplexed video signal and any other narrowband signals, and produces a wideband digital composite signal. The wideband composite signal is then converted to an analog signal, power amplified, and transmitted.

At the receiving site, the process is reversed. A receiving antenna and digital tuner provide a wideband digital signal containing the signals in multiple channels. A digital filter bank, or channelizer, separates the digital channel signals and forwards them to a set of digital demodulators. The demodulated signals are then fed to a multiplexing switch, which, under command from the central controller, directs the proper channel signals containing the video information to a first-in first-out buffer memory. The reconstructed digital video signal is then decompressed and converted back to analog form for display.

BRIEF DESCRIPTION OF THE DRAWINGS

The foregoing discussion will be understood more readily from the following detailed description of the invention, when taken in conjunction with the accompanying drawings, in which:

FIG. 3 is a detailed block diagram of a digital channelizer used in the multichannel receiver; and FIG. 4 is a more detailed block diagram of a digital combiner used in the multichannel transmitter.

DETAILED DESCRIPTION OF A PREFERRED EMBODIMENT

Figure 1:
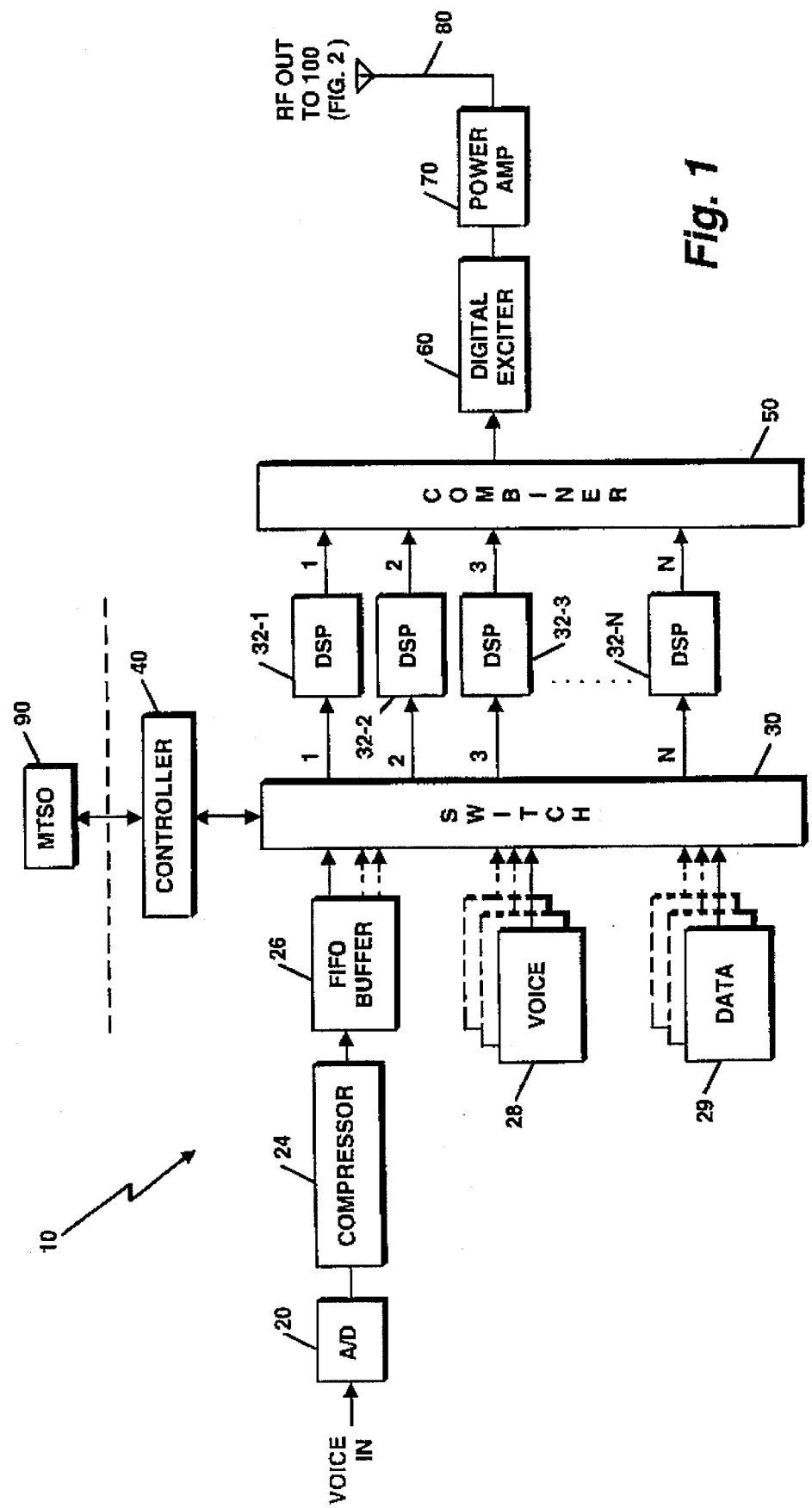
FIG. 1 is a block diagram of a multichannel transmitter embodying the present invention.

FIG. 1 illustrates the components of a signal transmitting station 10 embodying the principles of the present invention. The transmitting station 10 accepts a video signal from a source of one or more video signals (not shown) and formats the signal for transmission using multiple channels of a wireless multichannel communication system such as a cellular, personal communications system (PCS), or other type of multichannel communication network.

Figure 2:
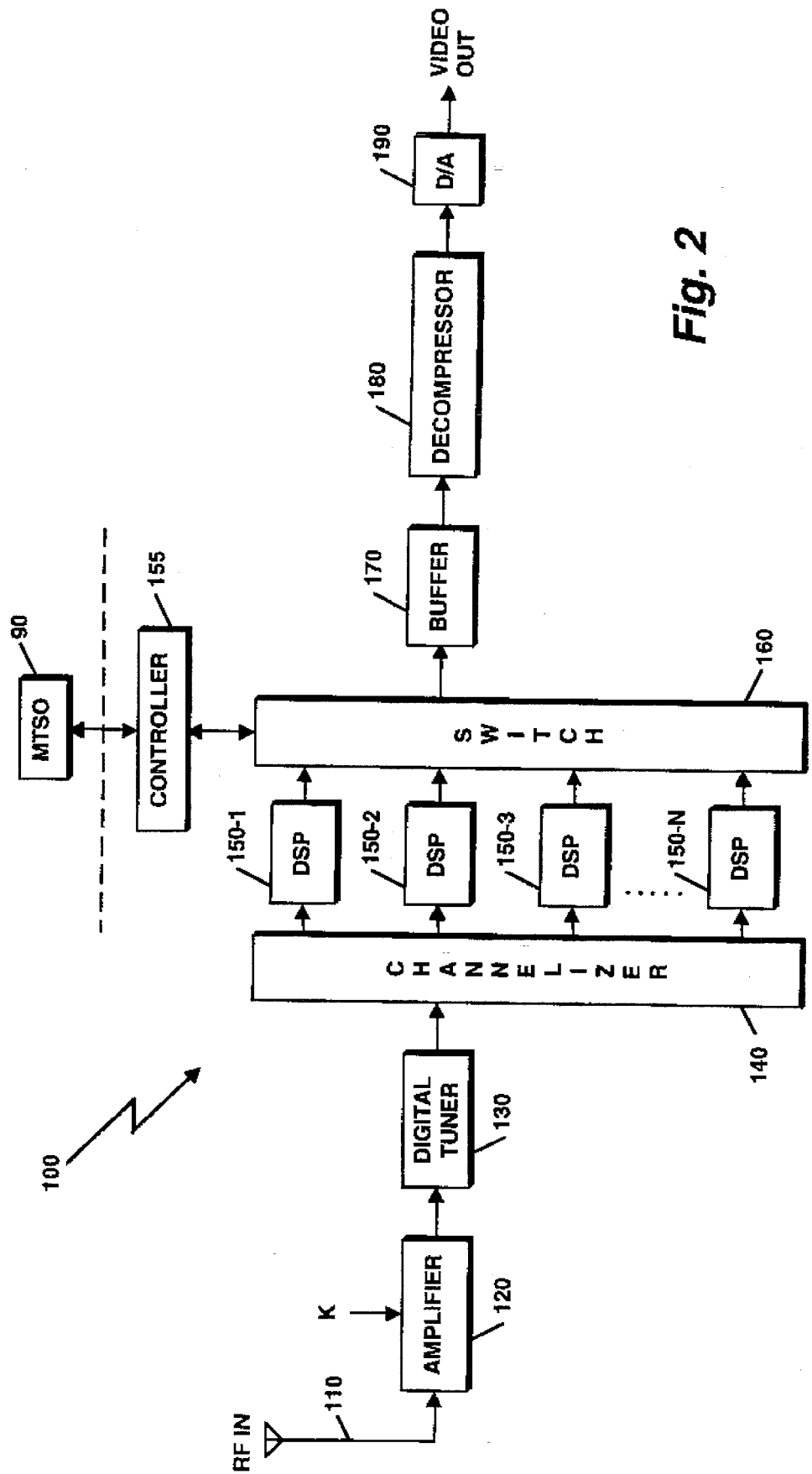
FIG. 2 is a block diagram of a multichannel receiver suitable for use in conjunction with the transmitter illustrated in FIG. 1.

The formatted multichannel signal is then forwarded over the air to a receiving station 100 as depicted in FIG. 2. The receiving station removes the transmission formatting from the multiple channel signals, reassembles them into the proper format, and then forwards them to a video signal destination at the receiving site.

In an application such as broadcast or cable television, the transmitting station 10 provides the video signals to multiple receiving stations 100. Thus, the transmitting station 10 may be considered to be implemented at a site operated by a video signal carrier. The receiving stations 100 are then at the sites of the subscribers. While this assumption is sometimes made in the following detailed description, it should be understood that in other applications the receiving station 100 and transmitting station 10 may be located anywhere that a multichannel wireless communication system is available to provide services. It should also be recognized that duplexing is possible, that is, there may be both a transmitting station 10 and receiving station 100 at a given physical location, such as, for example, to support video conferencing.

Returning attention to FIG. 1, the transmitting station 10 includes at least an analog to digital converter (A/D) 20, a multiplexing switch 30, a switch controller 40, a digital combiner 50, a wideband exciter 60, a wideband power amplifier 70, and a transmit antenna 80. Other elements of the transmitting station 10 may include a video signal compressor 24, a video signal buffer 26, multiple sources of other, narrowband signals to be transmitted such as voice signal sources 28 and data signal sources 29, and digital signal processors 32-1, 32-2, 32-3, . . . , 32-n (collectively, DSPs 32).

The A/D converter 20 digitizes the incoming wideband video signal into a series of digital signal samples so that it can be processed by the transmitting station 10. The digitized video signal may be first subjected to a bandwidth compression function such as that specified by the well-known JPEG II standard. The video signal samples may also be buffered as needed by the buffer 26, which is preferably a first-in first-out (FIFO) memory.

In any event, the switch 30 receives the digitized video signal as well as any voice signals and data transmissions from digital signal sources 28 and 29, and then allocates the video, voice and data among the N channels available at the input to the combiner 50.

The controller 40 identifies available wireless channel capacity and governs the operation of the switch 30. The controller 40 and switch 30 thus operate together to connect the samples of the video signal from the buffer 26 or the signals from the other signal sources 28 and 29 to any of the N inputs of the combiner 50.

The set of N digital signal processors (DSPs) 32 each receives an input from the switch 30. Each DSP 32 typically services a separate communication channel by modulating the respective digital signal in accordance with the appropriate air interface standard used by the wireless multichannel communication system.

The number of channels, N, and the nature of the air interface standard implemented by the DSPs 32 depends on the particular communication service serviced by station 10. For example, in a cellular mobile telephone (CMT) application operating in accordance with the Advanced Mobile Phone Specification (AMPS), the relevant bandwidth ranges from approximately 824 MHz to 849 MHz. This bandwidth is typically shared by two competing service providers, so-called "System A" and "System B" providers, so that the operator of an AMPS system has 12.5 MHz of available bandwidth, which is ordinarily allocated as 416 channels of 30 kHz bandwidth each. While the ensuing discussion assumes the use of an AMPS system, this is for illustrative purposes only and is not intended to be a limiting example; other bandwidths and other air interface standards, may be accommodated. For example, Personal Communication System or PCS, Time Division Multiple Access (TDMA) such as IS-54B, Code Division Multiple Access (CDMA) such as IS-95, frequency hopping standards such as the European Group Special Mobile (GSM), and the like may be used.

The combiner 50 is a type of inverse digital filter bank that synthesizes the N individual digitally modulated signals output by the DSPs 32 into a wideband composite digital signal suitable for transmission. The combiner 50 is discussed in greater detail in connection with FIG. 4.

The digital exciter 60 converts the wideband digital signal to analog form.

The power amplifier 70, in turn, then provides a radio frequency (RF) signal suitable for actual transmission over the antenna 80.

The input video signal may originate with any conventional video source. Most standard video signals have a 6 MHz bandwidth, and because wireless communication channels in systems such as AMPS only provide channels having a much narrower bandwidth of, say, 30 kHz each, the video signal is preferably first fed through a video compressor 24. Suitable compression algorithms and implementing hardware are well-characterized in the art, and their particular hardware characteristics are not critical to operation of the invention. The JPEG II video compression standard, for example, can compress the video signal so that only 1.5 Megasamples per second (Msps) are required.

The compressed digital video signal preferably accumulates in a first-in first-out memory buffer 26 until it is applied to the switch 30 in the manner hereafter described. The buffer 26 is used to normalize the data rate input to the switch 30. Not only can gaps in transmission of a video signal be tolerated in many application, but even if they cannot, the compressed video signal may typically not have a fixed data rata, but a rate which varies as the information in the video signal varies. For example, when the content of the video signal is changing rapidly, the data rate will be maximized, but when the video signal does not change very much from frame to frame, the data rate output by the compressor 24 may be relatively low.

The switch 30 acts to route the digital voice and data signals, as well as the compressed video signal from buffer 26, to the various channels served by the DSPs.

The switch 30 may be implemented in various ways, depending upon the number and type of video signals being transmitted. For example, the switch 30 may simply be a commutator which selects digital signal samples from the FIFO buffer 26 and voice 28 and data circuits 29 in sequence. However, for maximum flexibility in planning the use of the N channels, the switch 30 is preferably embodied as a time division multiplex (TDM) bus. In such a switch 30, each of the voice 28 and data 29 signal sources is typically assigned a time slot on the bus, with each bus time slot associated with one of the N channels on the output side of the switch 30. Since the FIFO buffer 26 will provide samples of the digitized and compressed video signal at a rate which is much greater than the rate of the voice 28 or data 29 signal sources, the FIFO buffer 26 must typically be assigned to several time slots on the TDM bus, since the video signal will typically occupy multiple ones of the N outgoing channels.

The availability of the N channels on the output side of the switch 30 is determined by a channel-assignment controller 40, which communicates with a central controller such as a mobile telephone switching office (MTSO) 90. The channel-assignment controller 40 reports both channel utilization needs and excess channel capacity to the MTSO 90, which then allocates and de-allocates channels to the transmitting station 10 as appropriate. It should be noted that unlike conventional cellular base station in which a fixed number of channel assignments are made to each station 10, the transmitting station 10 according to the invention made use of a wideband combiner 50. As a result, the MTSO 90 can provide as many channels to the transmitting station 10 as may be required on demand to service the video, voice, and data signals.

The MTSO 90 thus distributes channel space (i.e., bandwidth) to controller 40, and the controller 40 manages the channel space that it has been accorded at a particular time by the MTSO 90. That channel space is allocated among voice, data and video signals, by controller 40 and/or the MTSO 90, based on associated priorities. These include, most obviously, the aggregate level of channel utilization (real or anticipated) by voice and data subscribers served by the transmitting station at any particular time.

In accordance with the preferred embodiment of the present invention, the voice and data signal sources 28 and 29 ordinarily have channel-assignment priority over the video signals. As a result, the output digital signal from the FIFO buffer 26 is typically assigned, in a shifting (and perhaps temporarily irregular) fashion that varies with overall traffic demand, to channels not otherwise occupied. The parameters that determine how video is allocated among the channels depend in part on characteristics of the video data and in part on user-specified constraints.

If necessary, the video data samples may be organized into "packets" of information that may be transmitted in discrete bursts over one or more channels. In such an instance, each packet may generally include an identification header, a series of bits representing a segment of video data and an "end-of-burst" code. Preferably, the equipment for which the video data is ultimately destined in the receiver 100 accommodates a variable-length burst, thereby allowing controller 40 to vary the size of the data segment according to channel availability.

In operation, the controller 40, maintains a schedule, or table, of channel availability (which varies over time) and, based thereon, assigns paths through the switch 30 (i.e., time slots in the case of a TDM bus), for the digitized video signal provided by buffer 26. The retrieved data samples are typically grouped in blocks, and the blocks are chosen, typically dynamically, such that each block can be sent in its entirety through a single channel or designated group of channels.

Other considerations for channel allocation can include, for example, the tariff structure or the priority associated with the video transmission. Thus, communication providers ordinarily offer a variety of service levels, with the "tariff" paid by a particular customer affecting the amount of bandwidth to which he is accorded priority at a given time; high-tariff video customers may receiver priority with respect to a greater number of channels than low-tariff customers. Priority levels may also be associated with the video transmissions themselves and include, for example, a maximum tolerable transmission gap applicable to all video customers. The present invention, therefore, eliminates the need for prearranging dedicated channels in advance for video information, since dynamically allocated, unused capacity is utilized instead.

From the N outputs of the switch 30, each of DSPs 32-1, 32-2, . . . , 32-N provides its single-channel output to a combiner 50, which creates from the individual channel signals a composite "wideband" digital signal occupying a significant portion of the radio bandwidth assigned to the station 10. The combiner 50 may use any of a number of multirate digital signal processing techniques to implement an inverse digital filter bank.

For example, as shown in FIG. 4, the combiner 50 may include a set of sample rate converters 443-1, 443-2, ..., 443-N, and an N point inverse FFT unit 442, and a deconvolutional digital filter 440. A co-pending U.S. patent application Ser. No. 08/224,754, entitled "Transceiver Apparatus Employing Wideband FFT Channelizer with Output Sample Timing Adjustment and Inverse FFT Combiner for a Multichannel Communication Network", filed Apr. 8, 1994 and assigned to AirNet Communications Corporation, the assignee of this application, describes several particular preferred embodiments of the combiner 50 in detail.

The composite digital signal output by the combiner 50 is fed to a digital exciter 60, which includes appropriate digital-to-analog (D/A conversion and analog filtering equipment. The exciter also performs frequency translation, to shift the baseband analog signal to the RF frequency required for transmission. The output of the exciter 60 is then RF amplified by amplifier 70 and transmitted by the antenna 80.

As shown in FIG. 2, the N-channel transmitted signal is received at a receiving station 100, and then resolved into its individual channel components by a companion digital filter bank, or channelizer 140. The individual channel signals are then reassembled to provide the video signal.

The receiving station 100 may typically include video signal display equipment such as a simple television set owned by a customer of the video transmission service. In such an application, the receiving station 100 may be referred to as a so-called set top box which accepts a wideband signal, extracting therefrom the desired digitized video data and reformatting it for the video display.

More particularly, the receiving station 100 includes a receiving antenna 110, amplifier 120, a digital tuner 130, channelizer 140, a set of demodulator DSPs 150-1, 150-2, 150-3, ..., 150-N (collectively, demodulators 150), a controller 155, a multiplexing switch 160, a buffer 170, a decompressor 180, and digital-to-analog (D/A) converter 190.

The antenna 110 receives the transmitted signal and delivers it to an amplifier unit 120. The gain of amplifier 120 is controlled by a gain-control input K, which determines whether the associated digital tuner 130 is to service relatively strong or relatively weak signals.

The amplified signal is then fed to a digital tuner 130, an exemplary embodiment of which includes a downconverter, to shift the received RF signal to a baseband frequency, and one or more analog bandpass filters, and a A/D converter. The digital tuner thus provides at its output a replica of the composite digital signal generated by the combiner 50 in the transmitting station 10.

The output of the digital tuner 130 is then filtered by the filter bank channelizer 140 to separate the N individual channel signals. The configuration of channelizer 140 and combiner 50 are essentially complementary. While no particular digital filter structure or filtering algorithm for combining or separating the channels is critical to the invention, a suitable architecture is briefly described here; the aforementioned patent application should be referred to for greater detail.

FIG. 3 is a high level block diagram of a channelizer 140 according to the invention which includes a convolutional filter 340, an FFT processor 342, and a plurality of sample rate converters 343-1, 343-2, ..., 343-N. A single rate converter is associated with each of the N output channels provided by the channelizer 140.

The convolutional filter 340 accepts signal samples from the digital tuner 130 (FIG. 2) and performs a first portion of a set of operations necessary to separate the wideband digital input into the N separate digital channel signals, each of which represents the contents of a respective one of the communication channels received by the wideband multichannel receiver 100. The convolutional filter 340 may be embodied using an overlap and add structure or a polyphase structure, and each of these implementations is discussed in the aforementioned patent application. Briefly, the convolutional filter 340 acts as a sliding analysis window which selects out and weights successive short time segments of the input samples.

The discrete Fourier transforms of the sequences provided by the FFT 342 thus represent time spectra, for example, with a particular sampling frequency. The size of the analysis window, that is the tap length of the filter 340, and the size, or number of points of the FFT 342, determine, respectively, the time and frequency resolution of the resulting short time spectrum.

The FFT unit 342 produces a number, N, of output signals referred to as digital channel signals. Each of the N digital channel signals output by the FFT unit 342 represent the contents of a respective one of the communication channels received by the multichannel receiver 100.

The digital channel signal output by the FFT unit 342 are then fed to the plurality of rate converters 343-1, ..., 343-N. There is one rate converter 343 associated with each respective input channel signal. The rate converters 343-1, ..., 343-N operate by determining interpolated digital signal values that correspond to the optimum sampling of each digital channel signal. In particular, each rate converter 343 provides samples of its respective digital signal taken at or near a position of peak symbol amplitude. Mathematically, this operation is equivalent to creating a zero-padded extension of the corresponding output bin of the FFT unit 342, and then filtering the zero padded signal with a low-pass, linear phase, finite impulse response (FIR) filter. The positions of the samples closest to the peak amplitudes of this low-pass filtered signal are then determined. The output of the filter is then determined with the proper timing, so that only the samples nearest the position of the peak amplitudes remain.

Optionally, the rate converters 343-1, ..., 343-N may also perform a sample rate difference adjustment to effect any necessary difference in rate of the samples provided by the FFT 342 and the sample rate expected by the demodulators 150. The rate converters 343-1, ..., 343-N are also discussed in greater detail in the co-pending patent application.

It can now be better understood how the illustrated architecture can analogously act as a signal combiner 50 used in the transmitting station 10. As shown in FIG. 4, the inverse functionality is implemented by a set of rate converters 443-1, 443-2, ..., 443-N to effect any sample rate difference in the rate of the input and output samples, an inverse FFT unit 442 adapted to combine the individual N channel signals into the composite signal, and a deconvolutional filter 440 which performs thereon operations inverse to those performed in the convolutional filter 340.

Returning now to FIG. 2, the remainder of the receiving station 100 will now be discussed in detail. From the N outputs of the channelizer 140, the digital channel signals are then fed to the demodulator functions performed by the digital signal processors 150-1, ..., 150-N. The demodulators 150 remove the modulation applied to the channel signals at the transmitting station 10 according to the implemented air interface standard. The demodulated signals, now equivalent to the original signals emerging from switch 30 in the transmitting station 10, are fed to a digital multiplexing switch 160.

The switch 160 operates analogously to the switch 30 in the transmitter 10. Specifically, connections through the switch 160, typically implemented as a TDM bus, are controlled by the controller 155, which maintains a table of channel assignments. The table may vary over time, under control of the MTSO, as in the case of the transmitting station 10. Given this information, the switch 160 diverts samples of the video signal as received from one or more of the N channels, to the buffer 170.

The buffer 170 is used to accumulate samples of the reconstructed video signal as they are produced by the switch 160. If the video signal was compressed at the transmitting station 10, it is then passed through a companion decompressor 180. The output of the decompressor 180 is in turn fed to a digital to analog (D/A) converter 190, from which is available the original analog video signal to be used by the video display device.

It will now be understood that the foregoing represents a highly advantageous approach to narrowband wireless transmission of video data that exploits existing channel capacity and thereby dispenses with the need for dedicated wideband video channels. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A transmitting station capable of transmitting a video signal over a plurality of narrowband wireless communication channels, the transmitting station comprising:

a. means for sampling the video signal;

b. buffer means, connected to the means for sampling the video signal, for accumulating the samples of the video signal;

c. means for identifying a plurality of available narrowband radio channels to which the samples of the video signal are to be assigned;

d. means, connected to the identifying means, for selecting a portion of the video samples from the buffer means, the number of selected samples being of a size such that they can be transmitted over one or more of the identified narrowband channels;

e. switching means, connected between the buffer means and the identified narrowband channels and responsive to the selecting means, for providing the selected portion of the video samples to the identified channels;

f. combiner means, connected to the identified narrowband channels, for combining signals from multiple channels into a single, wideband composite signal; and g. transmission means, connected to the combiner means, for transmitting the wideband signal.

2. The transmitting station of claim 1 additionally comprising:

means for assigning non-video information to the combiner means.

3. The transmitting station of claim 1 wherein the transmission means comprises:

a. means for converting a digital signal from the combiner means to an analog signal; and b. a wideband transmitter connected to the converting means.

4. The transmitting station of claim 1 wherein the selecting means formats the extracted video information into packets.

5. The transmitting station of claim 1 wherein the switching means is capable of selecting a plurality of portions of the video samples from the buffer means.

6. The transmitting station of claim 1 further comprising compression means, for compressing the video signal prior to sampling the video signal.

7. The transmitting station of claim 1 wherein the combiner means comprises:

a. an inverse Fourier transform-based unit; and b. a deconvolutional digital filter.

8. The transmitting station of claim 1 wherein the buffer means for accumulating the samples of the video signal is a first-in first-out memory.

9. The transmitting station of claim 1, wherein the buffer means is a first-in first-out memory buffer.

10. A transmitting station capable of transmitting a video signal over a plurality of narrowband wireless communication channels, the transmitting station comprising:

a. means for sampling the video signal;

b. buffer means, connected to the means for sampling the video signal, for accumulating the samples of the video signal;

c. means for identifying a plurality of available narrowband radio channels to which the samples of the video signal are to be assigned, wherein the identification means identifies channel space and time slots based on at least one of current channel utilization, expected channel utilization, and tariff structure;

d. means, connected to the identifying means, for selecting a portion of the video samples from the buffer means, the number of selected samples being of a size such that they can be transmitted over one or more of the identified narrowband channels;

e. switching means, connected between the buffer means and the identified narrowband channels and responsive to the selecting means, for providing the selected portion of the video samples to the identified channel;

f. combiner means, connected to the identified narrowband channels, for combining signals from multiple channels into a single, wideband composite signal; and g. transmission means, connected to the combiner means, for transmitting the wideband signal.

11. A receiving station for receiving a wideband radio frequency signal comprising multiple narrowband channelized signals representing a video signal, the receiving station comprising:

a. digital tuner means for receiving the wideband signal;

b. channelizer means for converting the wideband signal into a plurality of signal outputs, each channel signal having a predetermined channel bandwidth less than the bandwidth of the video signal; wherein the channelizer means comprises:

(i) a convolutional digital filter connected to receive the wideband signal, and which provides a digital filter output; and (ii) a last Fourier transform processor, connected to receive the digital filter output and to provide the plurality of channel signal outputs each having a predetermined channel bandwidth;

c. demodulator means, for demodulating the plurality of changed signals; and d. digital to analog conversion means, for converting the sampled video signal to an analog signal.

12. A method of transmitting a video signal over a multichannel wireless communication system, on which the bandwidth of each wireless channel is smaller than the bandwidth of the video signal, the method comprising the steps of:

a. sampling the video signals to provide a sampled video signal;

b. determining the identity of a number of wireless channels which are available for transmission;

c. demultiplexing the sampled video signal into a number of demultiplexed signals equal to the number of available wireless channels;

d. modulating the demultiplexed signals in accordance with an air interface standard in use by the multichannel wireless system, to provide a plurality of modulated signals;

e. combining the modulated signals to provide a composite signal; and f. transmitting the composite signal.

* * * * *